March 20, 1934. F. E. DUCKWALL 1,951,506
BIFOCAL LENS AND METHOD OF MAKING THE SAME
Filed Aug. 18, 1930   2 Sheets-Sheet 1
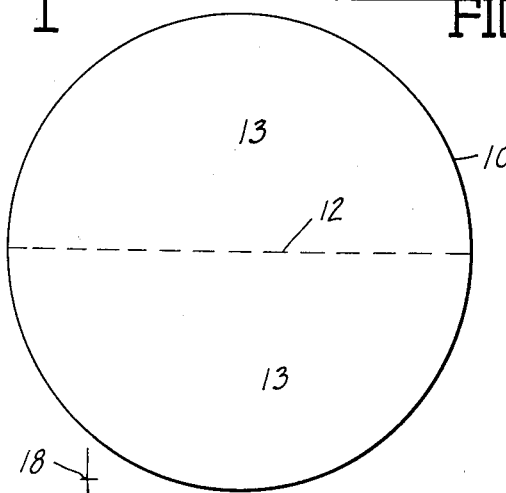
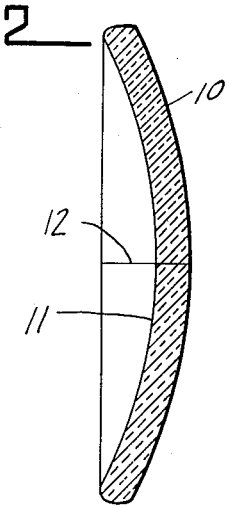
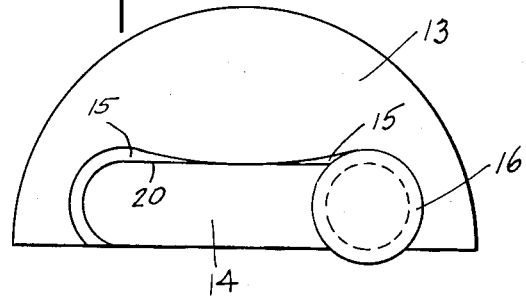
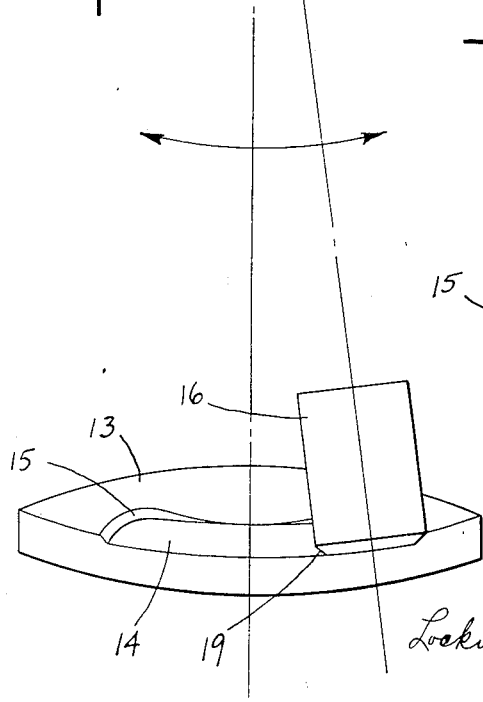
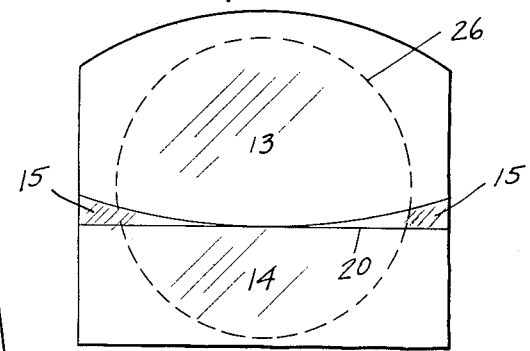
INVENTOR.
FRANK E. DUCKWALL.
BY Lockwood Lockwood Goldsmith & Galt
ATTORNEYS.

March 20, 1934.  F. E. DUCKWALL  1,951,506
BIFOCAL LENS AND METHOD OF MAKING THE SAME
Filed Aug. 18, 1930   2 Sheets-Sheet 2
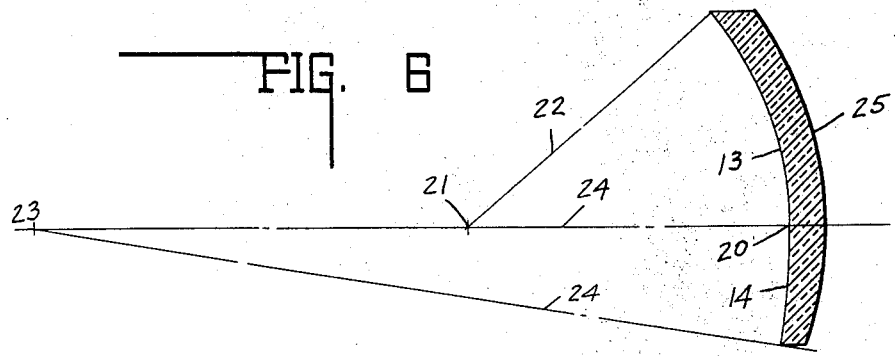
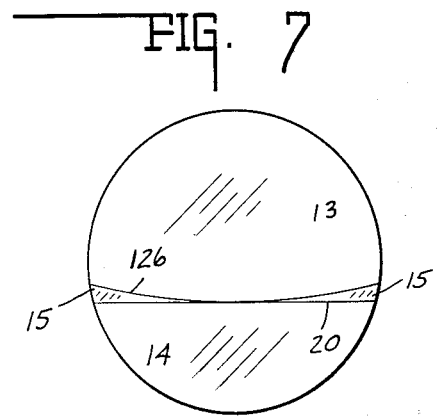
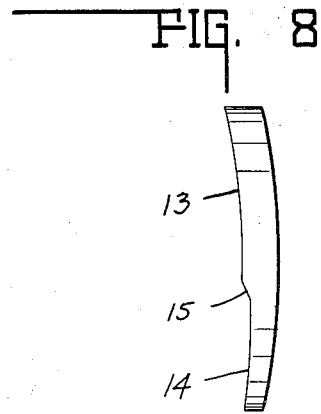
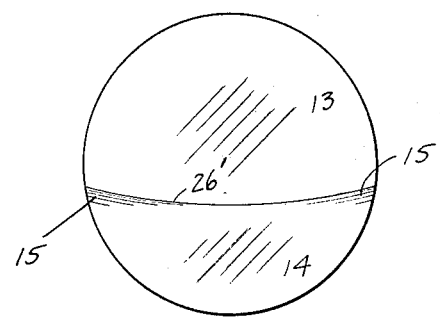
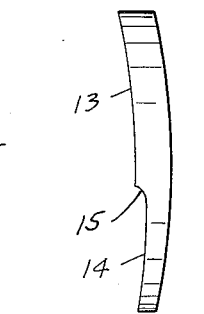
INVENTOR.
FRANK E. DUCKWALL
BY
Lockwood Lockwood Goldsmith & Galt
ATTORNEYS.

Patented Mar. 20, 1934

1,951,506

UNITED STATES PATENT OFFICE 1,951,506

BIFOCAL LENS AND METHOD OF MAKING THE SAME

Frank E. Duckwall, Indianapolis, Ind., assignor to Continental Optical Manufacturing Company, Indianapolis, Ind., a corporation Application August 18, 1930, Serial No. 475,934

5 Claims. (Cl. 88—54)

This invention consists of a one-piece bifocal lens for spectacles and the process of making the same. An object of the invention is to secure a monocentric bifocal lens which causes no positional jump of the image as the eye or line of vision normally passes from the distance field to the near field or the reverse, and the upper boundary line of the near field is straight across the lens and said field extends to the margin of the lower portion of the lens, and, at the center of the lens, merges smoothly with the distance field, whereby the eye or line of vision has practically unlimited sidewise range in the near field, and the areas between the distance and near fields at the two lateral edges of the lens merge smoothly with both fields and the lens is free from any ledge between fields.

Said lens has the virtues of the old Franklin's bifocal lens formed of two separate substantially semi-circular portions of different powers which met in a horizontal straight line, and, at the same time, it has the advantages of the one-piece bifocal lens wherein the fields are always in permanent relation with each other, and avoids the fragility and the decidedly visible line of separation of the two halves of the Franklin type of lens.

The full nature of the invention will be understood from the accompanying drawings and the following description and claims:

In the drawings, Fig. 1 is a plan view of a circular concave-convex glass blank suitable for ophthalmic lenses. Fig. 2 is a central vertical section through Fig. 1 after the distance curvature has been ground on the concave side. Fig. 3 is a side elevation of means for grinding the near field of vision on such a glass blank after splitting the circular glass blank shown in Fig. 1. Fig. 4 is a plan view of the blank and grinding tool shown in Fig. 3, at the end of the second step in the operation. Fig. 5 is a plan view of the blank on the bifocal side after the ends have been cut away and it is ready for the market. Fig. 6 is a central vertical section through the blank shown in Fig. 5 with the centers and radii of the curvatures indicated. Fig. 7 is a plan view of the finished lens. Fig. 8 is a side elevation thereof. Fig. 9 is a substitute tool for that shown in Fig. 3 for grinding the near field so as to leave no visible horizontal boundary line at the top of the near field. Fig. 10 is a finished lens after treatment by the tool in Fig. 9. Fig. 11 is a side elevation thereof.

In the manufacture of said lens, a saucer-shaped piece of glass 10, pressed into the form shown in Figs. 1 and 2, and about 90 mm. in diameter, is ground and polished on the concave side to form a continuous curvature 11 for distance vision, which curvature extends throughout the blank and might have a value of —6 diopters. Then said circular blank is split centrally on the line 12 to form two separate semi-circular blanks 13. The exact shape of the blank, however, is immaterial, as it may also be square or oblong.

The second step of the process consists in grinding on each of said semi-circular blanks 13 the near field 14 and the small inclined transitional areas 15. The distance field 13 has a deeper curvature than the near field 14 so that the near field can be formed by grinding down a portion of the distance field. The surfaces 14 and 15 are preferably simultaneously ground and the tool 16 for grinding the same is shown in Fig. 3.

As seen in Fig. 3, the grinding tool 16 extends beyond the lower margin of the blank, and it operates on the radius 17 from the center 18 suitable for forming a lesser curvature 14 on the blank than the distance curvature 11. Said grinding tool 16 has both rotary and oscillatory movement, as indicated, and the oscillatory movement is in a substantially straight line transversely of the lens blank. Since the tool 16 has a beveled shoulder 19 on its margin, as seen in Fig. 3, it forms transitional areas 15 between the distance and reading fields at the same time that it forms a reading field 14. With the tool having the angular shoulder between the grinding or bottom face of the tool and the shoulder 19, it forms a straight line 20 transversely of the lens blank as a boundary line for the top of the reading field, and said field extends to the margin of almost the entire lower half of the blank and lens. In the grinding action of the grinder 16, the near field 14 being ground always merges smoothly with the distance field in the central part of the lens, as shown, and that situation continues to exist when the grinding of the reading field 14 has been finished. This grinding operation imparts to the upper distance field a lower boundary line 126 which is curved laterally upward.

After the second grinding process has been completed, the right and left hand ends of the blank 13, as shown in Fig. 4, are cut or broken away so as to form the completed lens blank, as shown in Fig. 5. In Fig. 6 appears a central vertical section through the blank shown in Fig. 5 indicating the two curvatures 13 and 14 on the concave side, one being the distance field 13 which is ground from the center 21 with a short radius 22, and the other being the near field 14 which is ground from the center 23 on a longer radius 24. To make the lens monocentric, the two fields 13 and 14 are tilted with relation to each other so that the two centers 21 and 23 will be in alignment with the dividing line 20 between the two fields.

The completed blank shown in Fig. 5, therefore, is completely finished on its bifocal side, having the distance field 13, the almost semicircular near field 14 and two transitional areas 15, one near each lateral edge and extending half way or more towards the center and which areas merge smoothly with both the distance and reading fields so that there is no ledge. Hence, said areas are slightly inclined from the near field to the distance field, as indicated in Fig. 8.

The blank as thus made by the manufacturer, which is, however, not a completed lens, is handled, shipped and distributed to wholesalers and jobbers, who in turn distribute and sell them to the retailers and opticians. The reverse side or surface 25, as seen in Fig. 6, in the blank was roughly formed before the bifocal side of the blank was ground and polished. After the blank is finished and distributed to the retailer and optician, he finally grinds said surface 25 opposite the bifocal surfaces in a manner to give the completed lens the desired optical power characteristics. Then he edges the lens on the dotted line 26 in Fig. 5, or any other contour line to give the lens the desired general shape. When it is finished, it has substantially the appearance shown in Figs. 7 and 8.

Said lens is preferably made monocentric, as indicated in Fig. 6, but it is not necessary that said lens be monocentric or that it have a common radius line. The monocentricity is avoided, if desired, by tilting the near field at a greater or lesser angle than that indicated in Fig. 6, so that the two centers of the fields of vision will not coincide with the dividing line 20 of the lens. This form of lens is produced when various prismatic effects of the near field are desired, as required in certain prescriptions.

While the upper boundary line 20 of the near vision field has been referred to as a "straight" line, it should be noted that it will only appear straight when viewed from a certain angle, that is, when the lens is held squarely in front of the eye in the approximate position in which it is to be worn. If the blank be tilted to another angle, the line may not appear straight. If a ruler be placed across a concave disk and a line drawn with a china marking pencil, the apparently straight line thus produced will not appear straight, if the disk is tilted to another angle.

The transitional areas 15 are essential features of this lens because their inclinations are beveled and there are no vertical shoulders or ledges at the dividing lines between the fields 13 and 14.

An improvement on the foregoing process and lens will result from grinding the near field 14 with a tool 116 having a curved shoulder 119 on the margin of the grinding bottom surface. The result of this grinding process is the production of a lens, as shown in Figs. 10 and 11, wherein there is no visible straight transverse line 20 at the upper boundary of the near field 14. In place thereof there is a very gradual curvature from the upper part of the near field to the transitional areas 15, and the only visible line left on the lens is the curved line 26' forming the lower boundary of the distance field after the near field has been formed. However, the upper boundary of the near field 14 in this last form of the lens is substantially straight transversely of the lens.

Many advantages are found in said lens. The main advantage is the wide range of vision transversely of the lens in the upper part of the near or reading field. This transverse range of vision is as great in this lens as in the old Franklin type. This important advantage is attained in this lens and yet it is made of only one piece of glass instead of two separate pieces as in the Franklin lens. Also the lens can be readily made monocentric and the beveled areas 15 are inconspicuous, and, in fact, make the lens practically of the invisible type. Finally various prismatic effects in the near field, such as are often required in prescriptions, can be readily obtained by grinding the fields at different angles between them. It is believed that no onepiece bifocal lens in the prior art has combined in it the foregoing advantages and virtues.

It is, of course, obvious that the reading area might also be ground on the convex side of the blank by imparting to it a greater surface curvature than the contingent distance area.

The invention claimed is:

1. A bifocal lens having on one side surface thereof in its upper portion a distance vision field with its lower boundary line curved laterally upward, a near vision field below the distance field and having an upper transverse boundary line extending in a substantially straight line across the lens and merging with the distance vision field in the middle part of the lens and said field extending to the bottom and lateral margins of the lens, and transitional areas near the lateral edges of the lens between said distance and near fields which are inclined so as to merge smoothly with said distance and near fields, substantially as set forth.

2. The method of making a one-piece bifocal lens, consisting in first grinding the entire lens to a single uniform surface curvature on one side thereof, thereafter grinding the lower portion of said surface to a flatter uniform surface curvature bounded on top by a substantially horizontal straight line, merging without shoulder the two surfaces thus formed at the midpoint of the boundary line, and finishing the other side of the lens as prescribed.

3. The method of making a one-piece bifocal lens, consisting in first grinding the entire lens to a single uniform surface curvature on one side thereof, thereafter grinding the lower portion of said surface to a flatter uniform surface curvature bounded on top by a substantially horizontal straight line, merging without shoulder the two surfaces thus formed at the midpoint of the boundary line, said lower portion being mounted at such angle with respect to the original surface curvature that the two surfaces have a common radius at said midpoint, and finishing the opposite side of the lens as prescribed.

4. The method of making a one-piece bifocal lens, consisting in first grinding the entire lens to a single uniform surface curvature on one side thereof, thereafter grinding the lower portion of said surface to a flatter uniform surface curvature bounded on top by a substantially horizontal straight line, merging without shoulder the two surfaces thus formed at the midpoint of the boundary line, beveling the shoulder elsewhere produced so that the lower boundary thereof will coincide with said line, whereby the width of the bevel will increase from said midpoint outward and the upper boundary thereof will be upwardly curved, and finishing the other side of the lens as prescribed.

5. The method of making a one-piece bifocal lens, consisting in first grinding the entire lens to a single uniform surface curvature on one side thereof, thereafter grinding the lower portion of said surface to a flatter uniform surface curvature bounded on top by a substantially horizontal straight line, merging without shoulder the two surfaces thus formed at the midpoint of the boundary line, beveling the shoulder elsewhere produced so that the lower boundary thereof will merge into said lower portion without visible line of joinder, and finishing the other side of the lens as prescribed.

FRANK E. DUCKWALL.